(12) United States Patent
Mohamed et al.

(10) Patent No.: US 7,870,180 B2
(45) Date of Patent: Jan. 11, 2011

(54) METHOD AND APPARATUS FOR NONLINEAR SIGNAL AND DATA AGGREGATION

(75) Inventors: Magdi A. Mohamed, Schaumburg, IL (US); Weimin Xiao, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 1102 days.

(21) Appl. No.: 11/554,674

(22) Filed: Oct. 31, 2006

(65) Prior Publication Data

US 2008/0155270 A1 Jun. 26, 2008

(51) Int. Cl.
G06F 7/38 (2006.01)
(52) U.S. Cl. ...................................... 708/445
(58) Field of Classification Search ........................ None
See application file for complete search history.

(56) References Cited

U.S. PATENT DOCUMENTS

| | | | | |
|---|---|---|---|---|
| 7,589,729 | B2 * | 9/2009 | Skibak et al. | 345/441 |
| 7,656,978 | B2 | 2/2010 | Mohamed et al. | |
| 7,676,530 | B2 * | 3/2010 | Adkisson et al. | 708/207 |
| 2007/0194806 | A1 * | 8/2007 | Bangert | 326/37 |
| 2008/0103995 | A1 | 5/2008 | Mohamed et al. | |

OTHER PUBLICATIONS

Mohamed, et al., "Prior Art Coverage and Complexities from Invention Disclosure," Motorola, Inc. (Non-Published Document) 2 pages.

Schweizer, et al., "Associative Functions and Statistical Triangle Inequalities," Mathematicae Debrecen, No. 8, 1961, pp. 169-186.
Hamacher, et al., "Sensitivity Analysis in Fuzzy Linear Programming," International Journal of Fuzzy Sets and Systems, vol. 1, Issue 4, Oct. 1978, pp. 269-281.
M.J. Frank, "On the Simultaneous Associativity of F(x, y) and x+Y−F(x, y)," Aequationes Mathematicae, vol. 19, No. 1, Birkhauser Basel, Dec. 1979, pp. 194-226.
R.R. Yager, "On a General Class of Fuzzy Connectives," International Journal of Fuzzy Sets and Systems, vol. 4, 1980, pp. 235-242.
J. Dombi, "A General Class of Fuzzy Operators, the DeMorgan Class of Fuzzy Operators and Fuzziness Measures Induced by Fuzzy Operators," International Journal of Fuzzy Sets and Systems, vol. 8, 1982, pp. 149-163.
Zhou, et al., "Evolving Accurate and Compact Classification Rules with Gene Expression Programming," IEEE Transactions on Evolutionary Computation, vol. 7, No. 6, Dec. 2003, pp. 519-531.
Ferreira, "Gene expression programming: A new adaptive algorithm for solving problems," Complex Systems, 13 (2), 2001, pp. 87-129.

* cited by examiner

*Primary Examiner*—David H Malzahn
(74) *Attorney, Agent, or Firm*—Kenneth Haas

(57) ABSTRACT

A method (1500) and apparatus (700, 2300, 2400) for aggregating two or more input signals with a versatile reconfigurable signal aggregator. The aggregator (700, 2300, 2400) is reconfigured by adjusting a control signal λ, and can emulate a range of union type signal aggregators, a range of intersection type signal aggregators, and a continuum of functions between the two, including a signal averager. The versatility of the aggregator (700, 2300, 2400) allows systems in which the aggregator (700, 2300, 2400) is incorporated to be highly adaptable, and thereby fosters improved machine learning.

8 Claims, 14 Drawing Sheets

Prior Art

DIFFERENCE BETWEEN Q-AGGREGATE (λ=100) and MIN

1000

1100

DIFFERENCE BETWEEN Q-AGGREGATE ($\lambda=-1$) and MAX

1200

GENERIC PC BLOCK DIAGRAM

METHOD AND APPARATUS FOR NONLINEAR SIGNAL AND DATA AGGREGATION

FIELD OF THE INVENTION

The present invention relates generally to data fusion, nonlinear signal processing, and adaptive systems.

BACKGROUND

In many electrical circuits, there is a need to combine two or more signals to produce a signal based on the input signals. The process of combining two or more signals to produce a new signal based on the input signals can be broadly referred to as aggregation. In some cases it is desirable to combine two or more signals and obtain an average signal. For example, in thermal processing equipment, it may be desirable to use more than one temperature sensor and to average the readings in order to get a more representative value.

FIG. 1 is a prior art averaging circuit 100. The averaging circuit includes a first stage 102 and a second stage 104. The first stage 102 includes three inputs 106 that are coupled through three resistors 108 to an inverting input 110 of a first operational amplifier 112. A non-inverting input 114 of the first operational amplifier 112 is grounded. A feedback resistor 116 is coupled between an output 118 of the first operational amplifier 112 and the inverting input 110. The first stage 102 outputs an inverted average of the signals applied to the three inputs 106. The second stage comprises a fourth resistor 120 coupled between the output 118 of the first operational amplifier 112 an inverting input 122 of a second operational amplifier 124. A non-inverting input 126 of the second operational amplifier 124 is grounded. Another feedback resistor 128 couples an output 130 of the second operational amplifier 124 to the inverting input 122 of the second operational amplifier 124. Thus, the second stage 104 forms a unity gain inverting amplifier. The second stage 104 inverts the inverted average to produce the average.

FIG. 2 is a surface plot 200 of the average function. In FIGS. 2, 4 and 6 the independent variable axes labeled X and Y represent circuit inputs (note this is for the case of two inputs) and the value of the dependent variable (denote as Z in the plot 200) is the output of the circuit.

In some technical applications rather than an average of two signals, what is needed is the maximum of the two signals. For example in certain types of thermal processing it is more important to control the maximum temperature in order to avoid damaging work in progress.

FIG. 3 is a prior art MAX function circuit 300. The circuit 300 comprises a first input 302 coupled through a resistor 304 to an inverting input 306 of an operational amplifier 308. A second input 310 of the circuit 300 is coupled to a non-inverting input 312 of the operational amplifier 308. A forward biased diode 314 is coupled between an output 316 of the operational amplifier 308 and the inverting input 306. The signal produced at the output 316 is written in mathematical notation as MAX($V_1$, $V_2$) with $V_1$ and $V_2$ denoting the signals applied at the inputs 302, 310. FIG. 4 is a surface plot 400 of the MAX function.

In yet other types of systems, a circuit that produces a signal that is equal to the minimum of two circuits is needed. For example in certain thermal reactors it is important to have a signal representative of a minimum temperature in order to make sure that all areas of a material undergoing thermal processing have been subjected to at least a minimum specified thermal processing.

FIG. 5 is MIN function circuit 500. The MIN function circuit 500 differs from the MAX function circuit 300 in that the direction of the diode 514 is reversed. FIG. 6 is surface plot of the MIN function.

For certain complicated systems such as complex signal processing or control systems it may not be known ahead of time how two signals should be combined at one more stages within the systems. In these cases it would be desirable to provide a reconfigurable signal aggregator. It may be advantageous to allow an operator to reconfigure the signal aggregator or in some cases machine learning can be used to automatically determine an optimal configuration of the signal aggregator.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
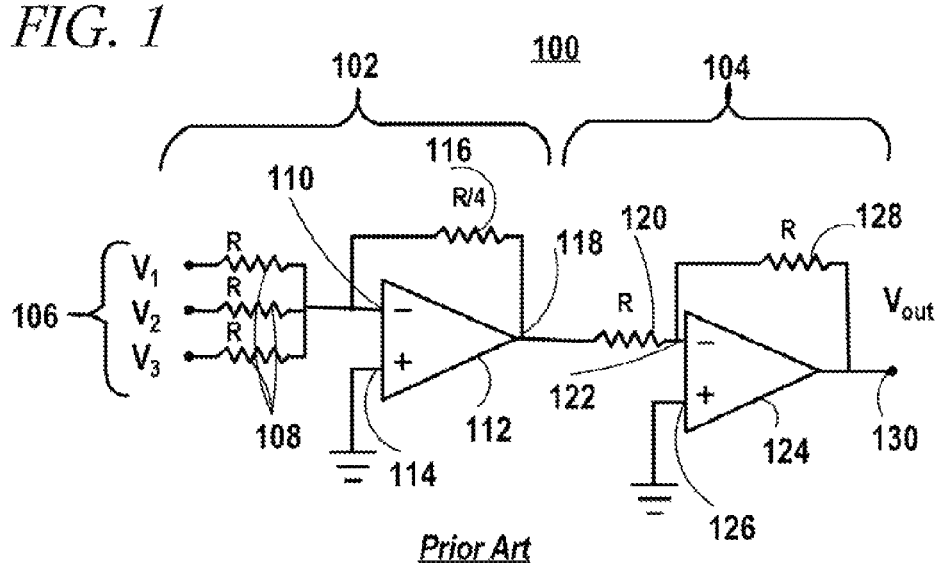
FIG. 1 is a schematic of a prior art averager circuit.
Figure 2:
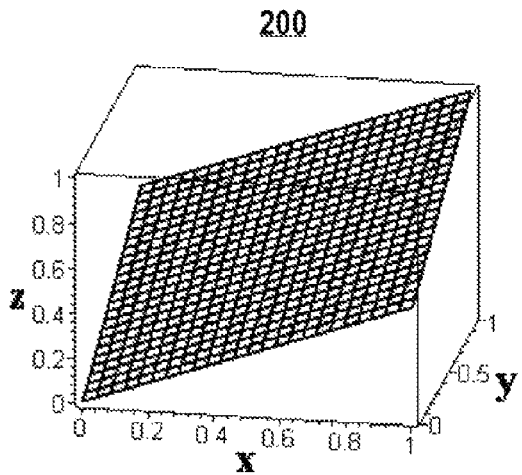
FIG. 2 is a surface plot of the average of two inputs.
Figure 3:
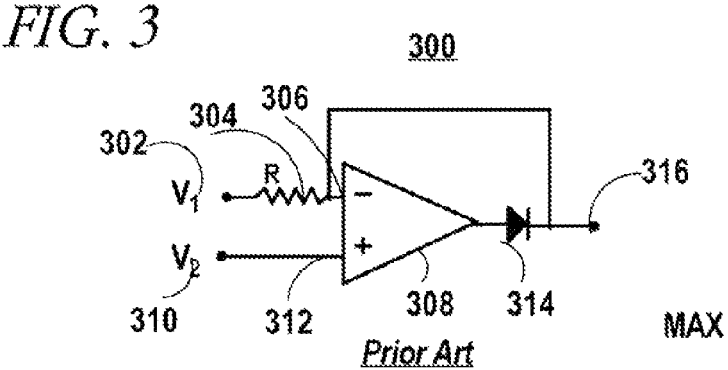
FIG. 3 is a schematic of a prior art MAX function circuit.
Figure 4:
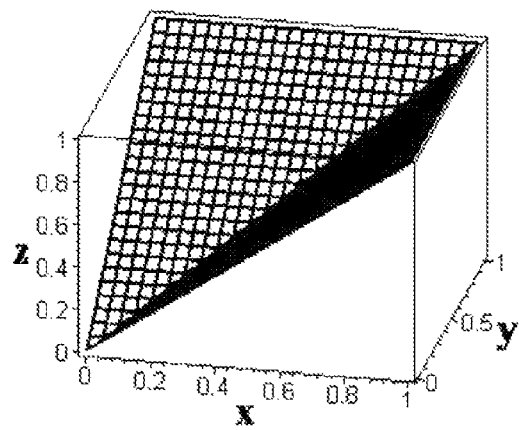
FIG. 4 is a surface plot of the MAX function.
Figure 5:
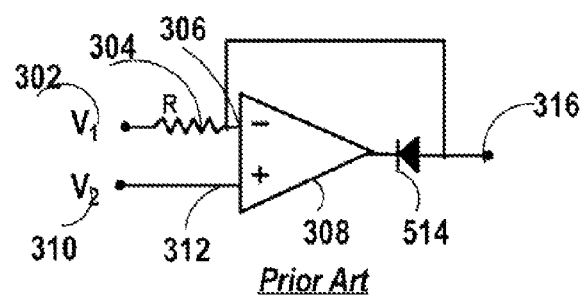
FIG. 5 is a schematic of a prior art MIN function circuit.
Figure 6:
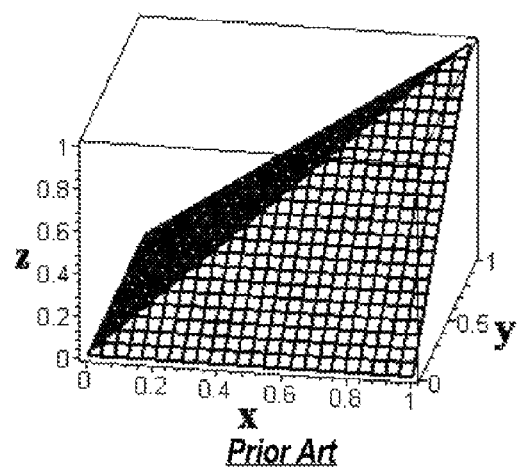
FIG. 6 is a surface plot of the MIN function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to signal and data aggregation. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of signal and data aggregation described herein. The non-processor circuits may include, but are not limited to, a radio receiver, a radio transmitter, signal drivers, clock circuits, power source circuits, and user input devices. As such, these functions may be interpreted as steps of a method to perform signal and data aggregation. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 7:
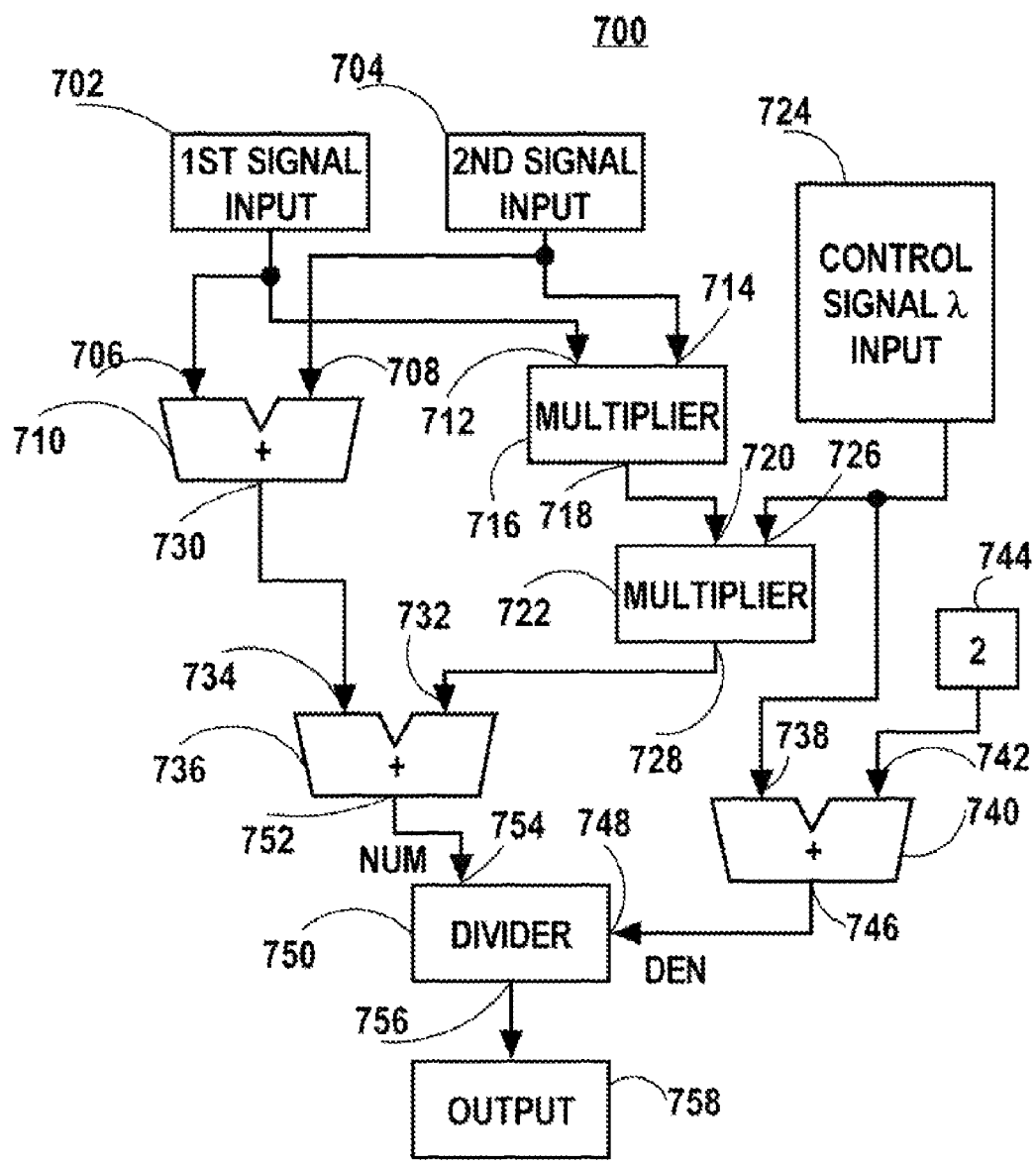
FIG. 7 is a block diagram of a signal aggregator according to an embodiment of the invention.

FIG. 7 is a block diagram of a configurable infinite logic signal aggregator 700 according to an embodiment of the invention. The aggregator 700 comprises a first signal input 702, and a second signal input 704 which are coupled to a first input 706 and a second input 708 of a first adder 710 and are also coupled to a first input 712 and a second input 714 of a first multiplier 716. An output 718 of the first multiplier 716 is coupled to a first input 720 of a second multiplier 722. A control signal input 724 of the aggregator 700 is coupled to a second input 726 of the second multiplier 722. An output 728 of the second multiplier 722 and an output 730 of the first adder 710 are coupled to a first input 732 and a second input 734 respectively of a second adder 736. The control signal input 724 of the aggregator 700 is also coupled to a first input 738 of a third adder 740. A second input 742 of the third adder 740 is set to a constant of two 744. An output 746 of the third adder 740 is coupled to a denominator input 748 of a divider 750. An output 752 of the second adder 736 is coupled to a numerator input 754 of the divider 750. An output 756 of the divider 750 is coupled to an output 758 of the logic signal aggregator 700. The aggregator can, for example, be implemented using a Field Programmable Gate Array (FPGA) or be built from separate components.

The operation of the configurable infinite logic signal aggregator 700 can be described by the following equation:

$$A_\lambda(x, y) = \frac{x + y + \lambda xy}{2 + \lambda} \quad \text{EQU. 1}$$

where, $x \in [0,1]$ is the signal applied to the first input 702, $y \in [0,1]$ is the signal applied to the second input 704, $\lambda \geq -1$ is the control signal applied to the control signal input 724, and $A_\lambda(x,y) \in [0,1]$ is the output of the configurable logic signal aggregator 700.

The signals applied to the first input 702 and second input 704 are suitably in the range of zero to one and the control signal is suitably greater than or equal to minus one. Equation 1 describes the operation of the two input aggregator shown in FIG. 1. The configurable infinite logic signal aggregators disclosed herein can be extended to accept more than two inputs. A generalization of equation 1 which describes the operation of configurable logic signal aggregators with more than two inputs is described by the following equation:

$$A_\lambda(a_1, \ldots, a_n) = \begin{cases} \dfrac{\prod_{i=1}^{n}(1+\lambda a_i) - 1}{\prod_{i=1}^{n}(1+\lambda) - 1} & \lambda \geq -1, \lambda \neq 0 \\ \dfrac{1}{n}\sum_{i=1}^{n} a_i & \lambda = 0 \end{cases} \quad \text{EQU. 2}$$

where, $\lambda \geq -1$ is the magnitude of the control signal;
$a_k \in [0,1]$ is a value of a $k^{th}$ input signal;
$n > 1$ is an integer number of input signals; and
$A_\lambda(a_1, \ldots, a_n) \in [0,1]$ is the output signal magnitude.

The number of inputs n is varied as needed for a particular system. The inputs $a_k$ are suitably in the range from zero to one and the control signal $\lambda$ is suitably greater than or equal to minus one. For such ranges of the inputs $a_k$ and control signal $\lambda$ the output $A_\lambda(a_1, \ldots, a_n)$ is also in the range zero to one.

According to an alternative embodiment the aggregator 700 comprises a microprocessor coupled to a memory that stores programming instructions for executing the aggregator function.

Depending on the setting of the control signal $\lambda$ the aggregator 700 can be configured to emulate a number of known functions, that are useful in signal processing systems such as fuzzy logic systems. Moreover, the aggregator function can also be used in place of existing functions or signal processing blocks in systems designed by automatic signal processing design software such as Gene Expression Programming (GEP), and Genetic Programming (GP) and in Artificial Neural Network (ANN) systems.

Setting the control signal to $\lambda$ to a high value e.g., one-hundred causes the aggregator 700 to perform a function that approximates the MIN function. The MIN function accepts two arguments and returns the lesser of the two as its output. With the control signal to $\lambda$ set at a high number the aggregator 700 also emulates the generalized mean with the exponent equal to a large negative number. Note that the generalized mean with the exponent equal to a large negative number is suitably used as a smooth approximation of the MIN function. Note also that the aggregating function given by equation 1 is also differentiable in all inputs $a_k$ and in the control signal $\lambda$. The MIN function is often used in fuzzy logic systems to combine the membership functions of inputs that are connected by the fuzzy intersection operator.

Figure 8:
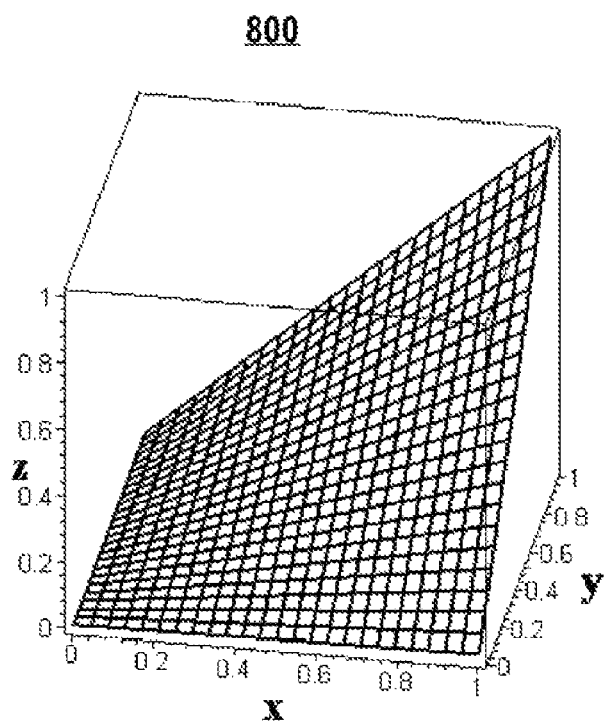
FIG. 8 is a surface plot of an input-output relation of the aggregator shown in FIG. 7 when the aggregator is configured by a control signal setting to emulate a fuzzy intersection function.
Figure 9:
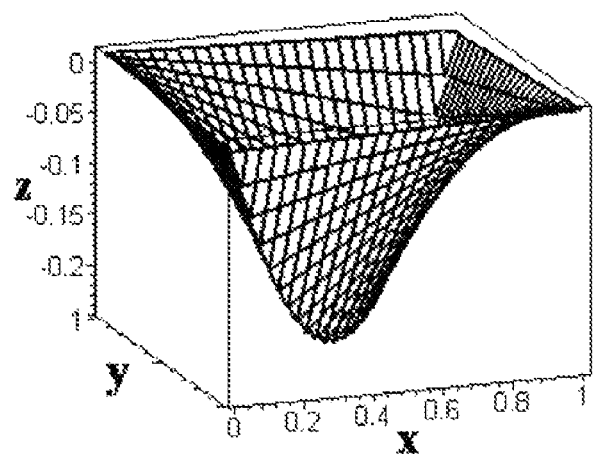
FIG. 9 is a surface plot showing the difference between the input-output relation of the aggregator and the MIN function when the aggregator is configured to emulate the fuzzy intersection function.
Figure 10:
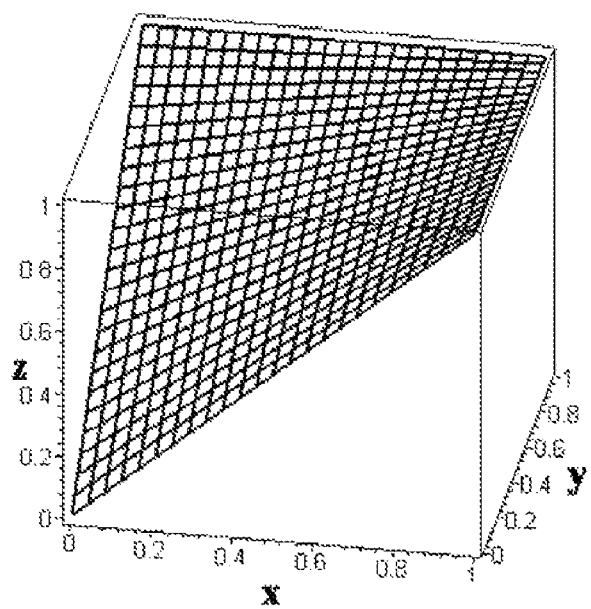
FIG. 10 is a surface plot of the input-output relation of the aggregator shown in FIG. 7, when the aggregator is configured by the control signal setting to emulate a fuzzy union function.
Figure 11:
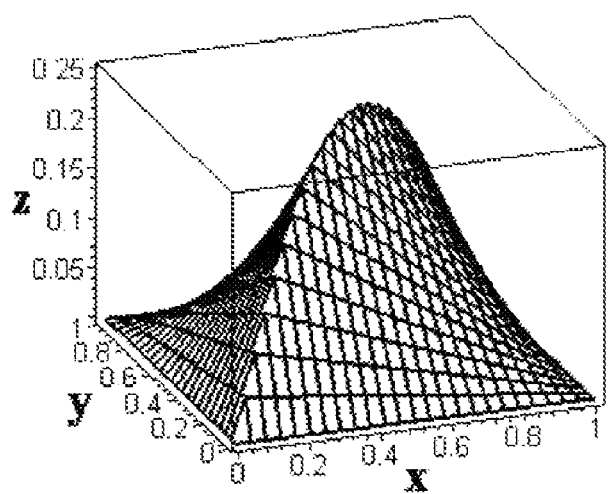
FIG. 11 is a surface plot showing the difference between the input-output relation of the aggregator and the MAX function when the aggregator is configured to emulate the fuzzy union function.
Figure 12:
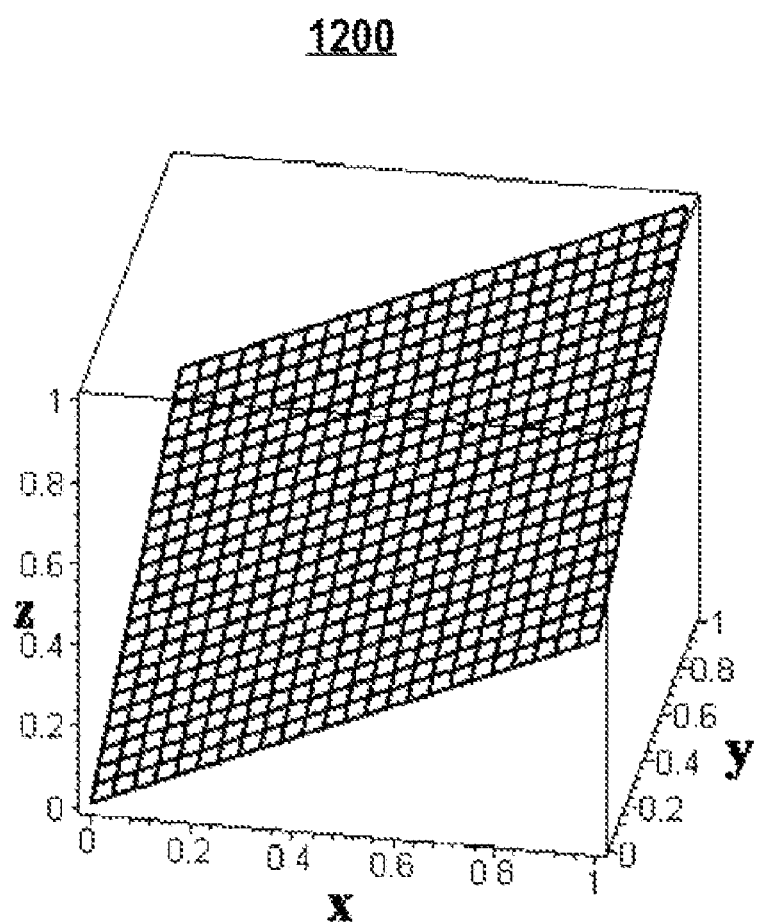
FIG. 12 is a surface plot of the input-output relation of the aggregator shown in FIG. 7, when the aggregator is configured by the control signal setting to emulate an averaging function.

Considering the case in which the aggregator 700 has only two inputs, allows the input/output relation of the aggregator 700 to be visualized using surface plots. FIG. 8 is a surface plot 800 showing the input-output relation of the signal aggregator shown in FIG. 7 when the aggregation function is configured by setting the control signal $\lambda$ equal to one-hundred in order to emulate a MIN function, which is suitably used as the fuzzy intersection operator. In FIGS. 8-12, the X-axis indicates a first input magnitude, the Y-axis indicates a second input magnitude. In FIGS. 8, 10, 12 the Z-axis indicates the aggregator output magnitude. In FIGS. 9, 11 the Z-axis represents the difference between the output of the aggregator output magnitude and an ideal function, MIN in the case of FIG. 9 and MAX in the case of FIG. 11.

The aggregator 700 is to a certain extent adaptive. For example, in the case that the aggregator 700 is configured by setting the control signal $\lambda$ equal to a high value to emulate the MIN function, the output of the aggregator 700 deviates somewhat from the MIN function, and the extent to which the output deviates depends on the values of the input signals. FIG. 9 is a surface plot 900 of the deviation of the aggregator 700 from the MIN function, when the aggregator 700 is configured with a control signal setting of $\lambda=100$. As seen in FIG. 9 the output of the aggregator 700 is approximately equal to the MIN function when either of the inputs is equal to one or zero but otherwise the output of the aggregator 700 is less than the MIN function to varying degrees. (Note that, for this specific choice of $\lambda=100$, the output of the aggregator 700 is larger than the MIN function by a small amount when one of the inputs is close to one and the other input is close to zero. For other permissible positive values of $\lambda>0$, the differences and their corresponding domain change nonlinearly but monotonically.) Otherwise, the output of the aggregator 700 is less than the MIN function to varying degrees.

Setting the control signal $\lambda$ to values approaching or equal to negative one causes the aggregator 700 to perform a function that approximates the MAX function. The MAX function accepts two arguments and returns the greater of the two as its output. With the control signal $\lambda$ set at a number approaching or equal to negative one the aggregator 700 also emulates the generalized mean with the exponent equal to a large positive number. The generalized mean with the exponent equal to a large positive number is suitably used as a differentiable approximation of the MAX function. FIG. 10 is a surface plot 1000 showing the input-output relation of the aggregator 700 when the control signal is set equal to negative one in order to emulate a MAX function.

FIG. 11 also illustrates the adaptive character of the aggregator. FIG. 11 is a plot of the deviation of the output of the aggregator 700 from the MAX function. As shown in FIG. 11 the output of the aggregator 700 is equal to the MAX function if either input signal takes on an extreme value, however for other input values the output of the aggregator 700 deviates from the MAX function to an extent that varies over the domain of input signal values. In particular the output of the aggregator is greater than the MAX function for signal values in the interior of the domain. (Note that, for this specific choice of $\lambda=-1$, the output of the aggregator 700 is less than the MAX function by a small amount when one of the inputs is close to one and the other input is close to zero. For other permissible negative values of $\lambda \in (-1,0)$, the differences and their corresponding domain change nonlinearly but monotonically (See FIG. 14).

Setting the control signal $\lambda$ to values approaching zero (e.g., 0.0001) causes the aggregator 700 to output a value that approximates the average of the input values. Averaging is a fundamental process that is applicable to a variety of types of technical systems including, for example, signal processing systems, control systems, and pattern recognition systems.

FIG. 12 is a surface plot 1200 of the input-output relation of the aggregator 700, when the aggregator 700 is configured by the control signal setting to approximate the averaging function. The surface plot 1200 is based on a control signal setting of 0.0001.

The settings of the control signal $\lambda$ discussed above are merely exemplary. In practice, the control signal $\lambda$ can take on different values, e.g., values in the range the range $-1$ to plus infinity. In certain embodiments the value of the control signal $\lambda$ will be set automatically in the course of machine learning. The ability to change the character of the aggregating function qualitatively by adjusting the value of the control signal $\lambda$, facilitates discovery of an appropriate rule (e.g., MIN, MAX, average, or some intermediate function) in the course of machine learning.

Figure 13:
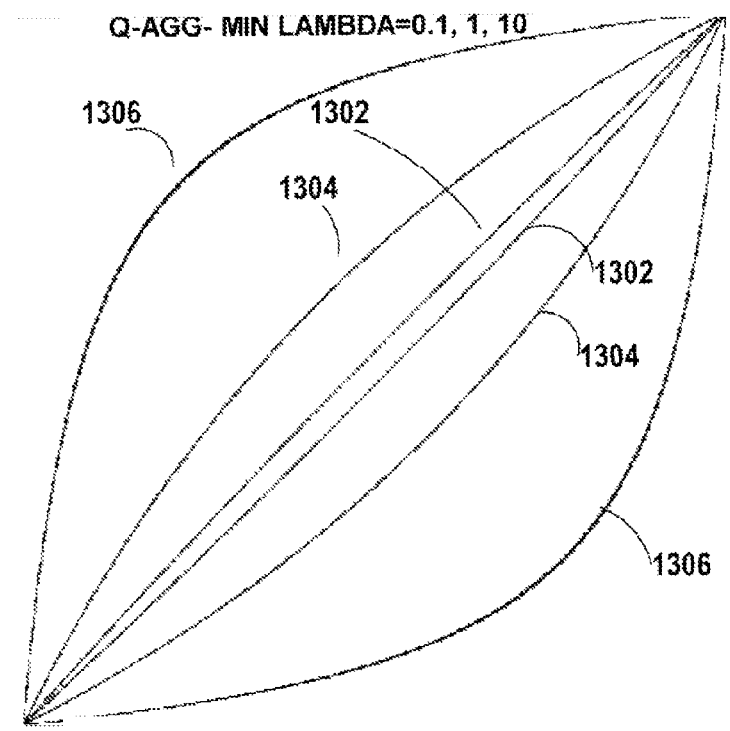
FIG. 13 shows contour plots at which the input-output relation of the infinite logic signal aggregator is equal to the MIN function for a few positive values of the control signal setting.

FIG. 13 shows contour plots 1302, 1304, 1306 at which the input-output relation of the infinite logic connective signal processor 700 is equal to the MIN function for a few positive values of a control parameter λ of the infinite logic signal aggregator 700, i.e., 1302, when λ=0.1, 1304, when λ=1.0 and 1306, when λ=10.0. In the interior of each contour plot 1302, 1304, 1306 the output of the infinite logic signal aggregator 700 is less than the MIN function, exterior to each contour the output is greater than the MIN function. In fuzzy logic systems, connective functions between the MIN and the MAX are referred to as averaging functions. In this context average is broader than the arithmetic mean, and includes generalized means with various exponents. It is worth noting here that even for a fixed positive value of the control parameter λ (e.g. λ=0.1), the present Q-Aggregate Operator $A_\Box(x,y)$ behaves either as a fuzzy intersection or average operator depending on the input values x and y. This characteristic of the present Q-Aggregate Operator can provide for higher degrees of adaptivity required for modeling systems with highly dynamic nature, and also for compact representation of logical expressions. This characteristic is also true for cases with more than two inputs (e.g. $A_\lambda(a_1, \ldots, a_n)$).

Figure 14:
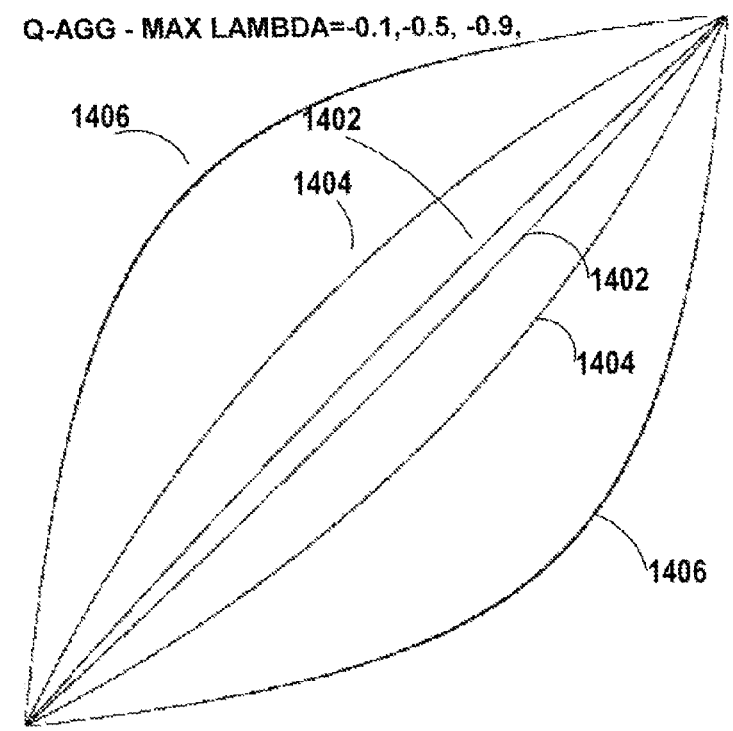
FIG. 14 shows contour plots at which the input-output relation of the infinite logic signal aggregator is equal to the MAX function for a few negative values of the control signal setting.

FIG. 14 shows contour plots 1402, 1404, 1406 at which the input-output relation of the infinite logic signal aggregator 700 is equal to the MAX function for a few negative values of the control parameter λ of the infinite logic signal aggregator 700, i.e., when λ=−0.1, 1402, when λ=−0.5, 1404, when λ=−0.9 1406. In the interior of each contour plot 1402, 1404, 1406 the output of the infinite logic signal aggregator 700 is greater than the MAX function and exterior to each contour the output is less than the MAX function. Similarly, it is worth noting here that even for a fixed negative value of the control parameter λ (e.g. λ=−0.1), the present Q-Aggregate Operator $A_\lambda(x,y)$ behaves either as a fuzzy union or average operator depending on the input values x and y. This characteristic of the present Q-Aggregate Operator can provide for higher degrees of adaptivity required for modeling systems with highly dynamic nature, and also for compact representation of logical expressions. This characteristic is also true for cases with more than two inputs (e.g. $A_\lambda(a_1, \ldots, a_n)$).

Figure 15:
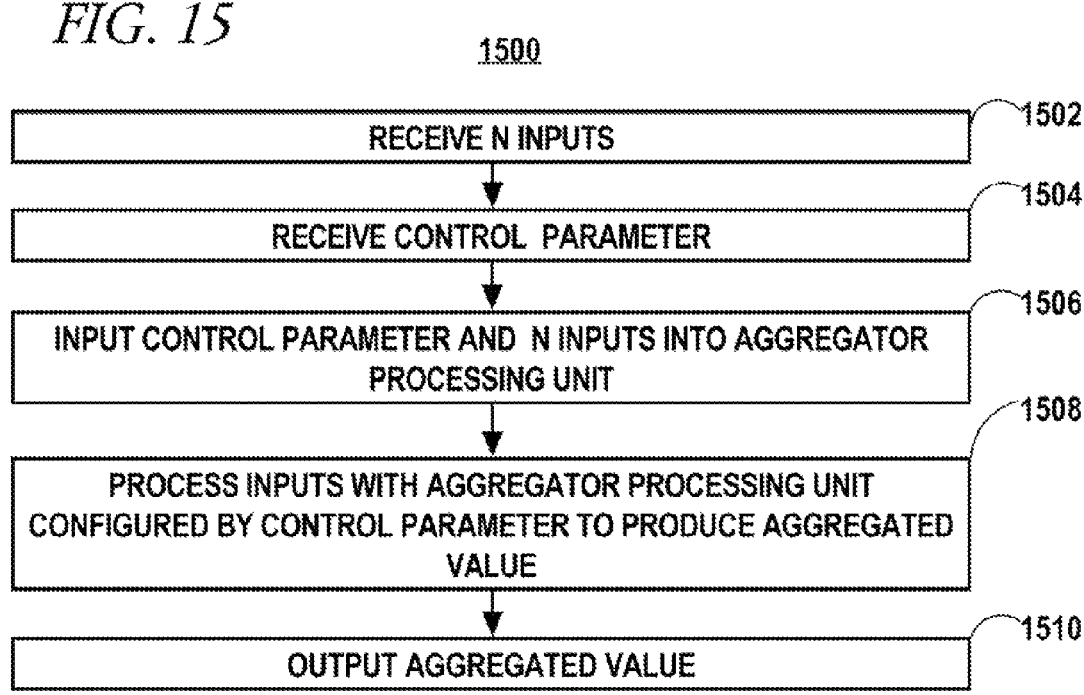
FIG. 15 is a flowchart of a method of aggregating inputs according to an embodiment of the invention.

FIG. 15 is a flowchart 1500 of a method of aggregating inputs according to an embodiment of the invention. In block 1502 a number N of inputs are received. In block 1504 the control signal λ is received. In block 1506 the control signal λ and the inputs are input into the aggregator 700. One skilled in the art will appreciate that the order of blocks 1502 and 1504 can be reversed or they can be executed in parallel. In block 1508 the inputs are processed by the aggregator 700 (which has been configured by the control signal) in order to produce an aggregate value. In block 1510 the aggregate value is output.

Figure 16:
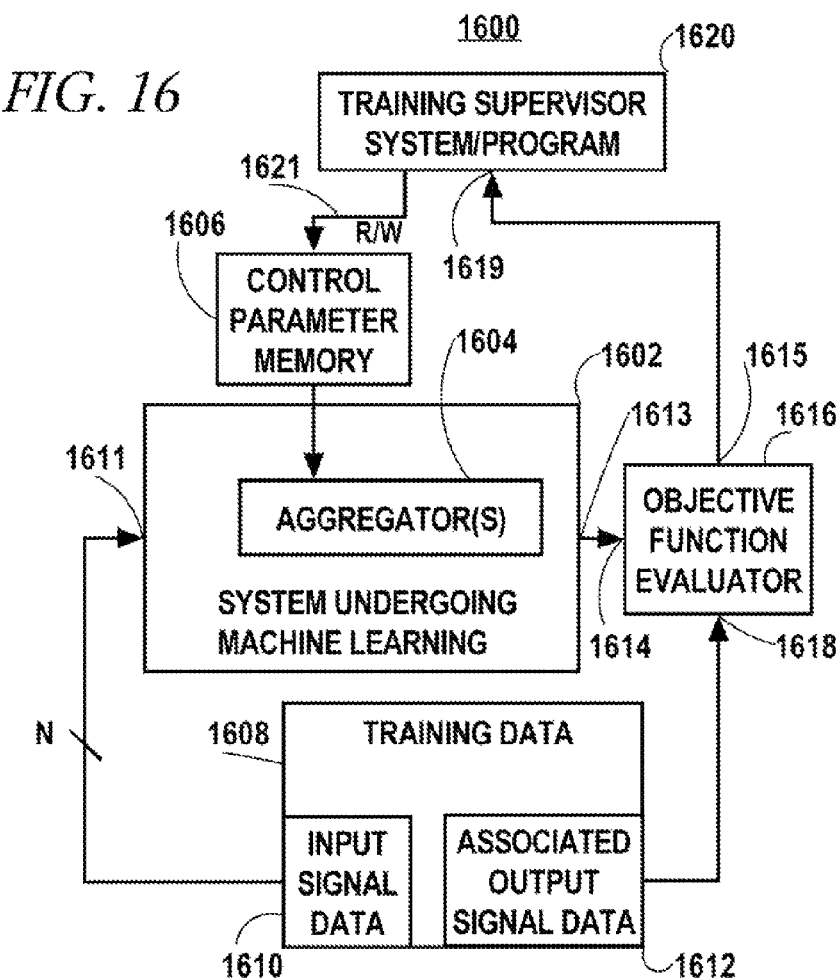
FIG. 16 is a high level block diagram of a machine learning system that uses one or more of the signal aggregators shown in FIG. 7.

FIG. 16 is a high level block diagram of a machine learning system 1600 that uses one or more of the signal aggregators 1604 of the type shown in FIG. 1. The machine learning system 1600 includes a processing system 1602 that can be trained in the machine learning system 1600. The processing system 1602 can be, for example, a statistical pattern recognition system, a genetic algorithm type system, a neural network system or some other type of signal processing system. The processing system 1602 can, for example, be used for image processing, pattern recognition or data mining applications. The processing system 1602 includes one or more aggregators 1604 of the type shown in FIG. 1 and described above. The aggregators 1604 are used to aggregate signals at intermediate stages within the processing system 1602. The control signal(s) λ of the aggregators 1604, which are stored in a control signal memory 1606, are not fixed. The control signal memory is coupled to the control signal inputs 724 of the aggregators 1604. The control signal(s) λ are set in the course of machine learning. The machine learning system 1600 also includes a training data memory 1608. The training data memory and the control signal memory 1606 can be implemented in a single physical memory or in physically separate memories. The training data memory 1608 stores training data that includes input signal data 1610 and associated output signal data 1612. The input signal data includes data for each of N inputs of the processing system. The number of inputs is typically related to a number of sensors, or the resolution of sensors with which the processing system 1602 is to be used after the processing system 1602 has been trained in the machine learning system 1600. The training data memory 1608 suitably stores many sets of training data spread over an entire range of values of inputs that the processing system 1602 is expected to encounter in actual use. The input signal data 1610 is fed into an input 1611 of the processing system 1602 which processes the input signal data to produce an output 1613 of the processing system 1602. The output 1613 of the processing system 1602 is input into a first input 1614 of an objective function evaluator 1616. The associated output signal data 1612 component of the training data is input into a second input 1618 of the objective function evaluator 1616. The objective function evaluator 1616 suitably evaluates a function that depends on the difference between the associated output signal data 1612 component of the training data and the output 1613 of the processing system 1602 that is produced in response to the input signal data 1610. An output 1615 of the objective function evaluator 1616 is coupled to an input 1619 of a training supervisor 1620. The training supervisor 1620 is coupled to the control signal memory 1606 through a read/write coupling 1621, allowing the training supervisor 1620 to read and update the control signal(s) λ. The training supervisor 1620 suitably implements an optimization strategy such as, for example, simulated annealing, a genetic algorithm, or a direct-search method. The training supervisor 1620 adjusts one or more of the control signals λ stored in the control signal memory 1606 according to the optimization strategy until a stopping criteria is met. The goal of optimization is to reduce the difference between the output of the processing system 1602 and the associated output signal data 1612 component of the training data 1608. Thus, the stopping criteria is based, at least in part, on the aforementioned difference. When the stopping criteria is met, a set of final values of the variable control signals λ are suitably stored for future use by the processing system 1602. The system 1600 is most readily implemented in software. However, for mass production it may be more economical to duplicate the processing system 1602 in hardware after the control signals have been determined using the machine learning system 1600.

Using the signal aggregators 1604 of the type shown in FIG. 1 that execute the aggregation function described by equation 1, allows the machine learning system to make qualitative changes in the manner in which signals are processed in the processing system 1602 by making adjustments to the control signals λ.

Figure 17:
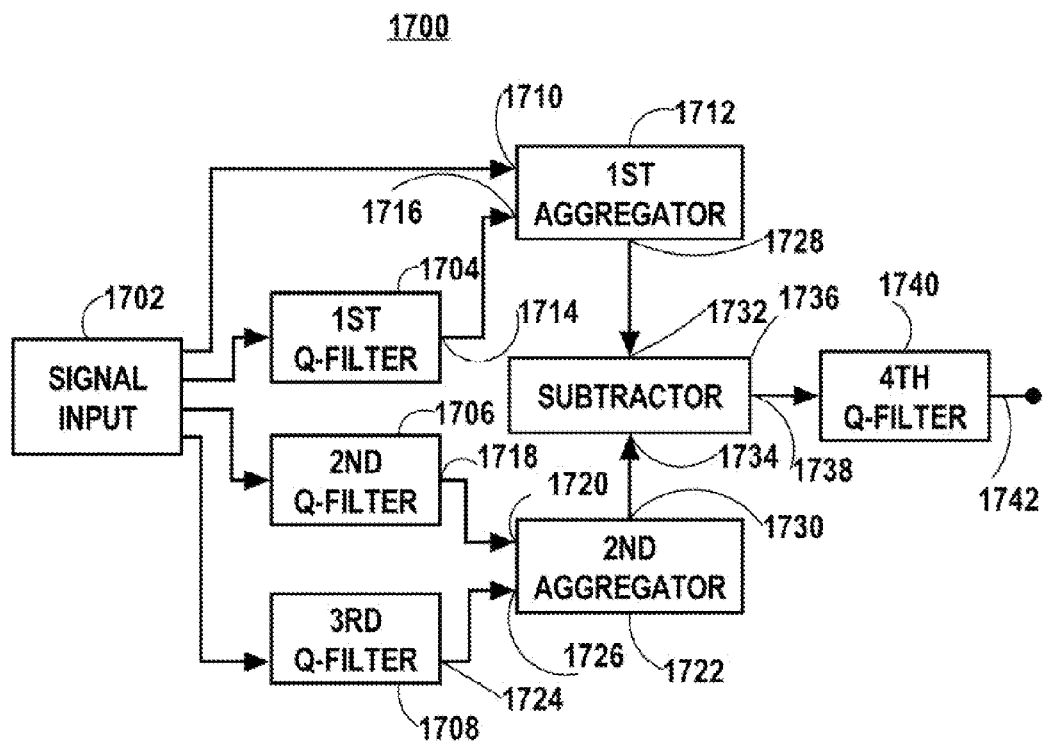
FIG. 17 is a block diagram of a heart beat signal processing system that uses the signal aggregator shown in FIG. 7.

FIG. 17 is a block diagram of a heart beat signal processing system 1700 that uses the signal aggregator shown in FIG. 1. The system 1700 has a signal input 1702 for receiving a heartbeat signal. The heart beat signal is suitably digitized so that the signal is represented by a series of samples, denoted $S_j$. A first Q-filter 1704, a second Q-filter 1706 and a third Q-filter 1708 are coupled to the signal input 1702 and receive the heart beat signal from the signal input 1702. A Q-filter such as 1704,1706,1708,1740 is a versatile filter that is generally non-linear but includes linear Finite Impulse Response (FIR) filters as a special case. Q-filters are covered in U.S. Pat.

No. 7,117,128B2 by M. Mohamed and W. Xiao. U.S. Pat. No. 7,117,128B2 is assigned to the same assignee as the present invention. A Q-filter can be defined by the following sequence of equations:

$$e = r_{min} + C \qquad \text{EQU. 3}$$

where, e is a filtered signal, $r_{min}$ is a minimum of an ordered sequence of thresholds to which the input signal $S_j$ is compared. The ordered sequence of thresholds is represented as: $r_o < r_1 < \ldots < r_{m-1}$. Note that $r_{min} = r_o <= S_j <= r_{m-1} = r_{max}$. The input signal is bounded between minimum threshold $r_{min}$ and maximum threshold $r_{max}$. If necessary, preamplification or attenuation is used to scale the signal appropriately. Furthermore:

$$C = \sum_{i=1}^{m-1} q_i \frac{r_{max} - r_{min}}{m-1} = \frac{r_{max} - r_{min}}{m-1} \sum_{i=1}^{m-1} q_i \qquad \text{EQU. 4}$$

where $$q_i = \begin{cases} \dfrac{\prod_{j=1}^{n}(1 + \lambda_f h_{ij} f^j) - 1}{F}, & \lambda_f \geq -1, \lambda_f \neq 0 \\ \dfrac{\sum_{j=1}^{n} h_{ij} f^j}{F}, & \lambda_f = 0 \end{cases} \qquad \text{EQU. 5}$$

where $\lambda_f >= -1$ is a filter control signal; and $$F = \begin{cases} \prod_{j=1}^{n}(1 + \lambda_f f^j) - 1, & \lambda_f \geq -1, \lambda_f \neq 0 \\ \sum_{j=1}^{n} f^j, & \lambda_f = 0 \end{cases} \qquad \text{EQU. 6}$$

where, $f^j$ are a sequence of density control signals in the range [0,1], and $h_{ij} = 1$ for $S_j >= r_i$ and otherwise $h_{ij} = 0$.

Generally the thresholds $r_i$ will be evenly spaced, although unevenly spaced threshold may be used as well. Once the spacing of the thresholds has been fixed, the values of the control signal $\lambda$ and of the density control signals $f^j$ remain to be fixed in order to fully define a Q-filter. $\lambda$ and $f^j$ are suitably determined by an optimization procedure that seeks to match the output of the filter to a model desired output. The optimization is performed using training data that includes input data, and associated ideal output data. During optimization, the difference between the actual output of the Q-filter and the ideal output data is monitored while the $\lambda$ and $f^j$ are adjusted in order to minimize the difference. A variety of optimization techniques, including but not limited to, methods that use simulated annealing, gradient information and direct-search methods can be used to optimize $\lambda$ and $f^j$.

Referring again to FIG. 17, the signal input 1702 is also coupled to a first input 1710 of a first aggregator 1712 of the type shown in FIG. 7. An output 1714 of the first Q-filter 1704 is coupled to a second input 1716 of the first aggregator 1712. An output 1718 of the second Q-filter 1706 is coupled to a first input 1720 of a second aggregator 1722 of the type shown in FIG. 7. An output 1724 of the third Q-filter 1708 is coupled to a second input 1726 of the second aggregator 1722. An output 1728 of the first aggregator 1712 and an output 1730 of the second aggregator 1722 are coupled to a first input 1732 and a second input 1734, respectively, of a subtractor 1736. An output 1738 of the subtractor 1736 is coupled to a fourth Q-filter 1740. An output 1742 of the fourth Q-filter 1740 serves as an output of the system 1700. The system 1700 can be trained in the machine learning system 1600 shown in FIG. 16. The machine learning system 1600 is suitably used to optimize the control signals $\lambda$ and $f^j$ of the Q-filters and the control signal $\lambda$ of the aggregator.

Figure 18:
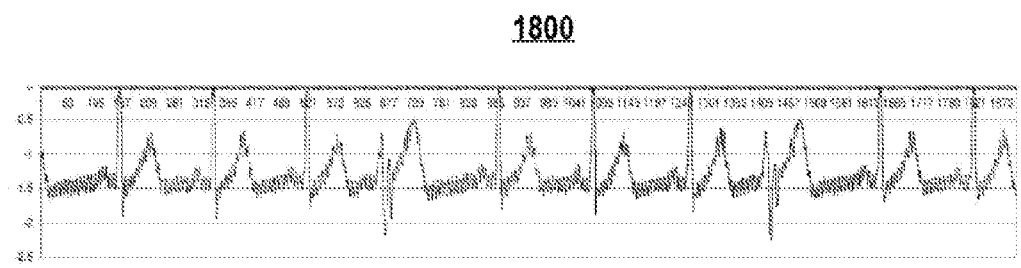
FIG. 18 is a signal trace of a heart beat signal used to test the system shown in FIG. 17.
Figure 19:
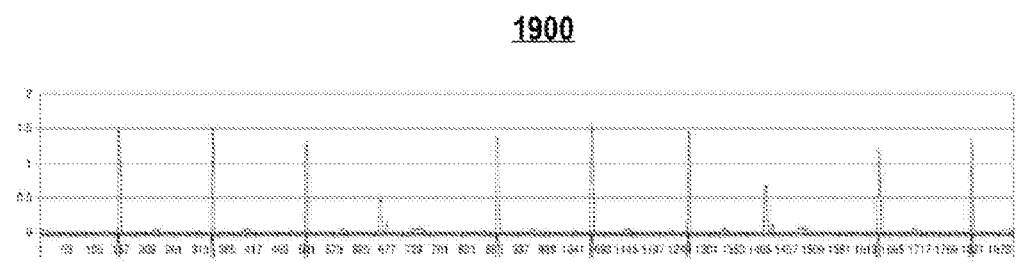
FIG. 19 is a signal output by the system shown in FIG. 15 in response to the heart beat signal shown in FIG. 18.

FIG. 18 is a signal trace of a heart beat signal 1800 used to test the system shown in FIG. 17. The objective for the system 1700 is to process the heart beat signal 1800 and produce a simplified signal that includes one spike for each heart beat. FIG. 19 shows a signal 1900 output by the system shown in FIG. 17 in response to the heart beat signal shown in FIG. 18. As shown in FIG. 19 the system produces signal spikes for each heart beat. The signal could be further simplified by adding a comparator at the output of the fourth Q-filter 1740. The comparator would produce a simple binary signal.

Figure 20:
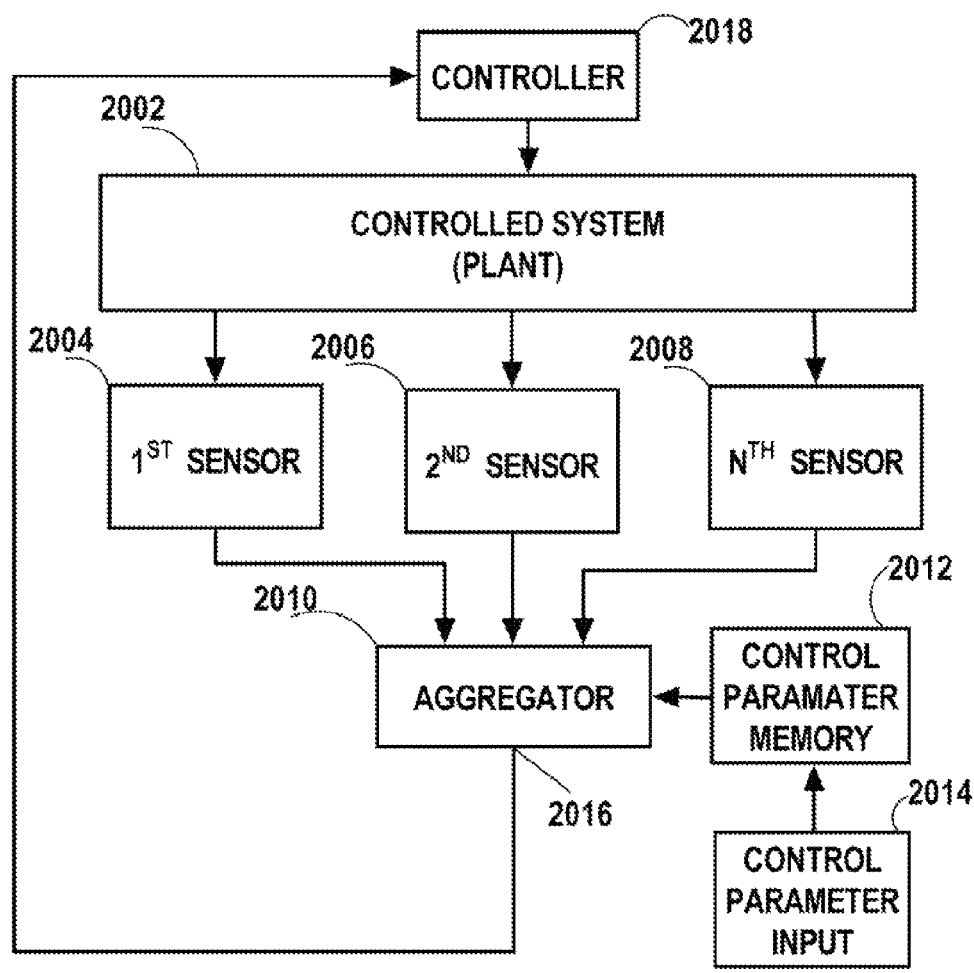
FIG. 20 is a block diagram of a system that uses the signal aggregator shown in FIG. 7.

FIG. 20 is a block diagram of a system 2000 that uses the signal aggregator shown in FIG. 1. The system 2000 includes a controlled system 2002. (In the field of control systems the controlled system 2002 is referred to as the 'plant'.) The teachings herein can be applied to a wide variety of controlled systems, including, by way of nonlimitive example, thermal processing systems, rubber molding apparatus, semiconductor processing equipment such as rapid thermal processing equipment, or plasma etching equipment. A plurality of sensors including a first sensor 2004, a second sensor 2006 and an $N^{TH}$ sensor 2008 collect readings from the controlled system 2002. (Although three sensors are shown for purposes of illustration, alternatively two, or more than three sensors are provided) The plurality of sensors 2004, 2006, 2008 will be of different type depending on the nature of controlled system 2002. Known types of sensors may be used. For example in the case of a thermal processing system, the sensors 2004-2008 include one or typically more than one temperature sensors. In the case of a semiconductor plasma etching apparatus, the sensors can include a plurality of spectrally filtered light detectors each monitoring a wavelength associated with the appearance or disappearance of an atomic or molecular plasma species that is correlated with an endpoint of a plasma etching process. The sensors 2004, 2006, 2008 are coupled to an aggregator 2010 of the type shown in FIG. 1. A control signal memory 2012 is also coupled to the aggregator 2010. A control signal input 2014, which may be part of a graphical user interface is used to set the value of the control signal in the control signal memory 2012. Alternatively, the control signal is fixed, e.g., in ROM and is not operator adjustable.

An output 2016 of the aggregator 2010 is coupled to a controller 2018. The controller 2018 is also coupled to the controlled system 2002. The controller 2018 controls the controlled system 2002 based, at least, on the signal received from the aggregator 2010. The controller can for example comprise a Proportional-Integral-Differential (PID) controller. By way of example, in the case that the controlled system is a thermal processing system, the controller 2018 controls one or more heaters in the controlled system 2002, based on the output of the aggregator. As another example, in the case that the controlled system is a plasma etcher the controller can turn off a plasma generator when the output of the aggregator 2010 passes a predetermined threshold.

Figure 21:
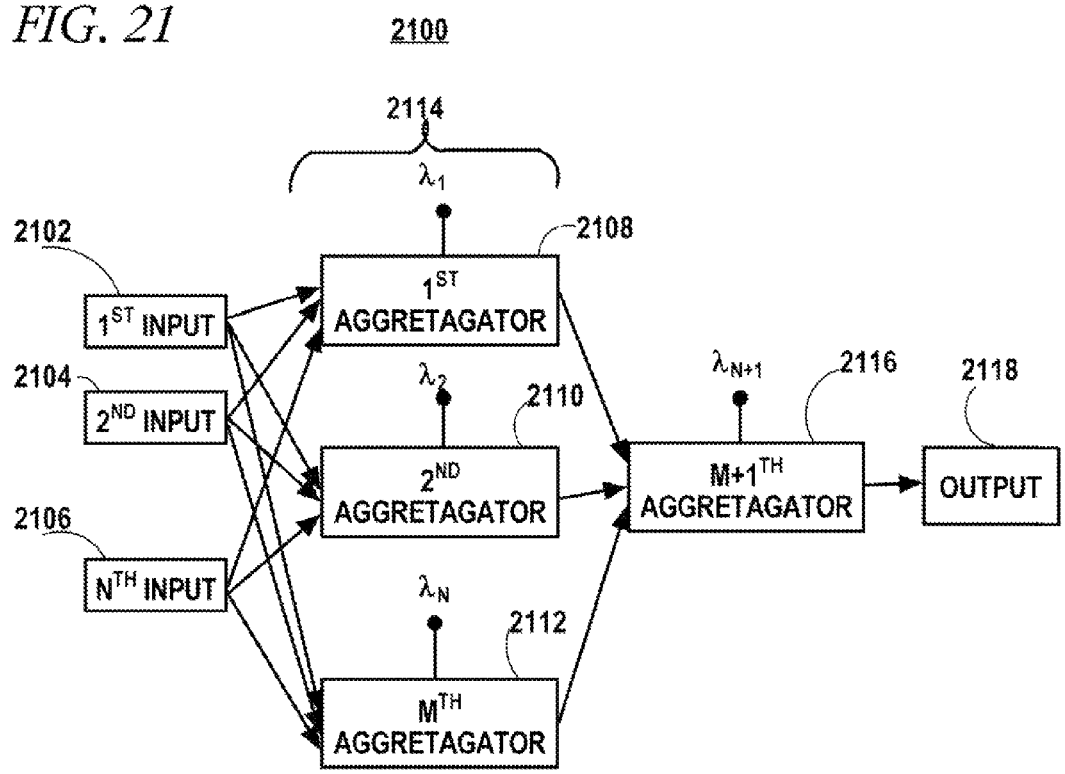
FIG. 21 is a block diagram of a neural network that uses the signal aggregator shown in FIG. 7.

FIG. 21 is a block diagram of an artificial neural network 2100 that uses the signal aggregator shown in FIG. 1. The neural network 2100 has a first input 2102, a second input 2104 and an $N^{th}$ input 2106. (Although three inputs are shown in FIG. 21 for purposes of illustration alternatively more or less than three inputs are provided.) The inputs 2102, 2104, 2106 are used to receive data directly from sensors or from a memory where the data has been stored temporarily. Various types of data, including audio data and image data, sensor data, or financial data, for example, can be processed by the neural network 2100.

The inputs 2102, 2104, 2106 are coupled to a first aggregator 2108, a second aggregator 2110, and an $M^{th}$ aggregator 2112 in a hidden layer 2114 of the neural network 2100. The inputs 2102, 2104, 2106 are coupled to the aggregators 2108, 2110, 2112 in the hidden layer 2114 by a plurality of links. The aggregators 2108, 2110, 2112 are coupled to an additional, output aggregator 2116 by three additional links. The links in the neural network 2100 may have variable gains $w_i$ (e.g., between 0 and 1) or may have fixed gains $w_i$ (e.g., 1). The output aggregator 2116 is coupled to an output 2118. The output 2118 can be coupled to a servo, display or memory for example. The nature of what is coupled to the output 2118 depends on the application of the neural network 2100. An example of an application of neural networks of the type shown in FIG. 21 is to perform nonlinear image processing. Although only one hidden layer is used in the neural network 2100 shown in FIG. 21, alternatively more than one hidden layer may be provided. Each aggregator in the neural network has its own control signal input. In the case that the links have fixed gains, the process of training the neural network is simplified because only the control signals lambda need to be determined. The neural network can be trained by a variety of optimization methods including by not limited to differential evolution, simulated annealing, and a gradient based optimization methods.

Figure 22:
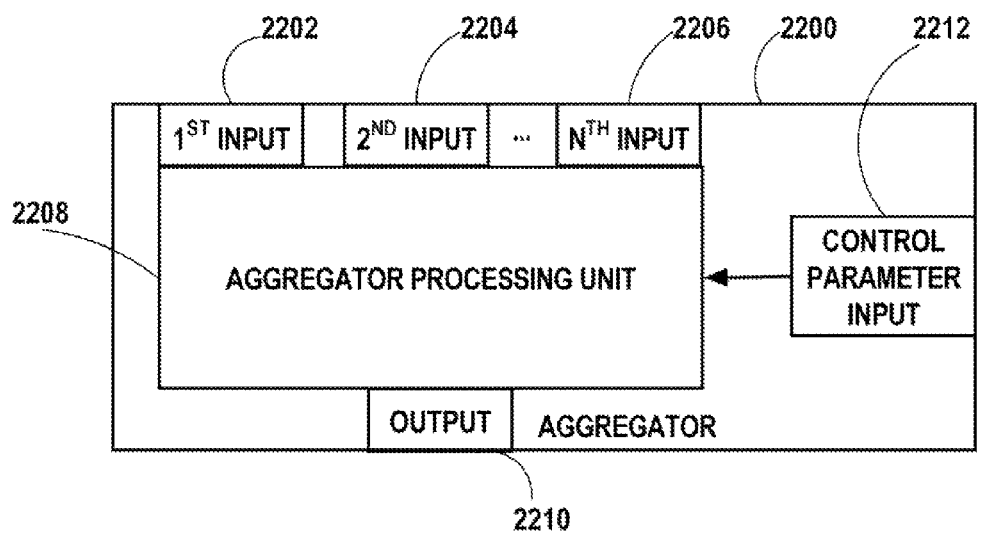
FIG. 22 is a high level block diagram of a signal aggregator according to an embodiment of the invention.

FIG. 22 is a block diagram of a signal aggregator 2200 according to an embodiment of the invention. The signal aggregator 2200 comprises a first aggregator input 2202, a second aggregator input 2204 and an Nth aggregator input 2206 coupled to an aggregator processing unit 2208. The aggregator processing unit 2208 is coupled to an aggregator output 2210. A control parameter input 2212 is used to input a control parameter. The control parameter input 2212 is also coupled to the aggregator processing unit 2208. Although three inputs 2202, 2204, 2206 are shown in FIG. 22 for the purpose of illustration, alternatively two inputs or more than three inputs are provided. The aggregator processing unit 2208 can have the internal design shown in FIG. 7. One skilled in the art will appreciate that alternative hardware designs are possible. Alternatively, in lieu of a specialized hardware circuit, the aggregator processing unit 2208 can comprise a microprocessor coupled to a memory storing programming instructions for executing the aggregation function given by equation 1 and 2.

Figure 23:
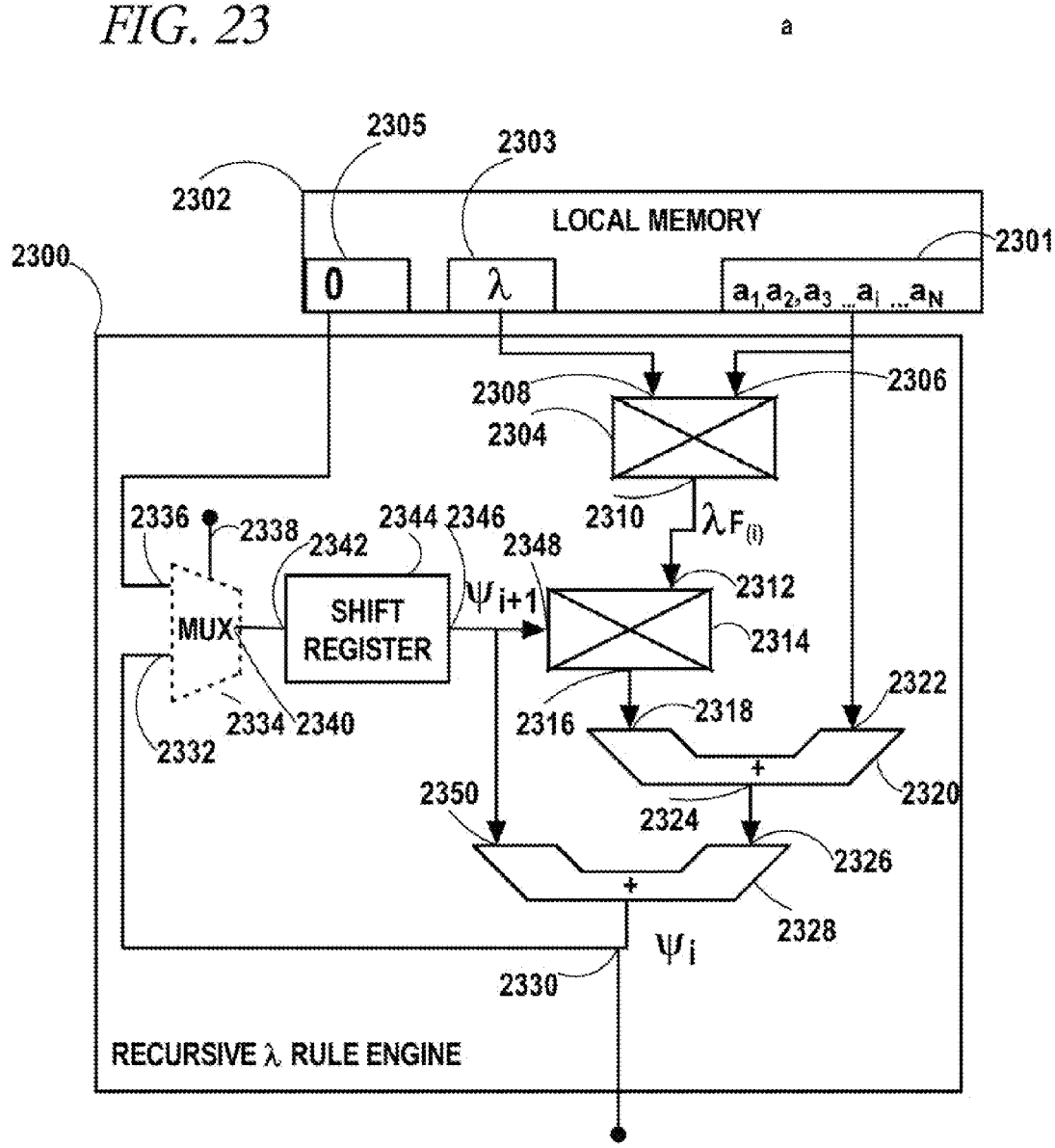
FIG. 23 is a block diagram of a recursive lambda rule engine and local memory that can be used to implement a signal aggregator according to an embodiment of the invention.

FIG. 23 is a block diagram of a recursive lambda rule engine 2300 and local memory 2302 that can be used to implement a signal aggregator according to an embodiment of the invention. The local memory 2302 includes an aggregator input register 2301, a control signal λ register 2303 and an initial value register 2305, which stores an initial value of zero. The aggregator input register 2301 is coupled to a first multiplier 2304 of the recursive lambda rule engine 114. Inputs $a_i$ are fed sequentially to a first input 2306 of the first multiplier 2304. The first multiplier 2304 receives the control signal λ at a second input 2308. The first multiplier 2304 outputs a series of products $\lambda_i$ at an output 2310. Note that the index i ranges from one up to the number of inputs.

The output 2310 of the first multiplier 2304 is coupled to a first input 2312 of a second multiplier 2314. The first multiplier 2304 in combination with the second multiplier 2314 form a three input multiplier. One skilled in the art will appreciate that signals input to the first multiplier 2304 and the second multiplier 2314 may be permuted among the inputs of the first multiplier 2304 and second multiplier 2314 without changing the functioning of the engine 2300. An output 2316 of the second multiplier 2314 is coupled to a first input 2318 of a first adder 2320. A second input 2322 of the first adder 2320 sequentially receives the inputs $a_i$ directly from the input register 2301. An output 2324 of the first adder 2320 is coupled to a first input 2326 of a second adder 2328. Accordingly, the first adder 2320 and the second adder 2328 form a three input adder. One skilled in the art will appreciate that signals input to the first adder 2320 and the second adder 2328 may be permuted among the inputs of the first adder 2320 and second adder 2328 without changing the functioning of the engine 2300.

An output 2330 of the second adder 2328 is coupled to a first input 2332 of a multiplexer 2334. A second input 2336 of the multiplexer 2334 is coupled to the initial value register 2305. An initial value of zero is stored in the local memory 2302 and received at the second input 2336. A control input 2338 of the multiplexer 2334 (under the control of an external controller, not shown) determines which of the first input 2332 and second input 2336 is coupled to an output 2340 of the multiplexer 2334. Initially the second input 2336 at which the initial value of zero is received is coupled to the output 2340. For subsequent cycles of operation of the recursive lambda rule engine 2300 the first input 2332 of the multiplexer 2334 which is coupled to the output 2330 of the second adder 2328, is coupled to the output of the multiplexer 2334 so that the engine 114 operates in a recursive manner.

The output 2340 of the multiplexer 2334 is coupled to an input 2342 of a shift register 2344. An output 2346 of the shift register 2344 is coupled to a second input 2348 of the second multiplier 2314 and to a second input 2350 of the second adder 2328.

The recursive lambda rule engine 114 executes the following recursion relation.

$$\psi_i = a_i + \psi_{i-1} + \lambda a_i \psi_{i-1}, i=1, \ldots, n \qquad \text{EQU. 7}$$

starting with:

$$\psi_0 = 0.$$

Recursion, is achieved by feeding the output of the second adder 2328 back to the second multiplier 2314 and the second adder 2328 through the multiplexer 2334 and shift register 2344.

During each cycle of operation, the output of the first multiplier is $\lambda_i$, the output of the second multiplier 2314 is $\lambda_i \psi_{i-1}$ (the third term in equation 1), the output of the first adder 2320 is $a_i + \lambda_i \psi_{i-1}$, and the output of the second adder 2328 is $\psi_{i-1} + a_i + \lambda_i \psi_{i-1}$. $\psi_n$ is equal to the numerator of equation two. The denominator of equation two is obtained by setting all the inputs $a_i$ in the input register 2301 equal to one and running the recursive lambda rule engine for N cycles until $\psi_n$ is obtained. Thus, one could use two recursive lambda rule engines in parallel to obtain the numerator and denominator of equation two, or alternatively a single recursive lambda rule engine is first to obtain either the numerator or denominator which is then stored and again to obtain either the denominator or numerator. The lambda rule engine 2300 is useful for applications in which many signal aggregation operations must be performed.

FIG. 22 is weighted signal aggregator 2200 that uses two of the recursive lambda rule engines shown in FIG. 21. The weighted signal aggregator 2200 supports variable weighting of different input signals. The input-output function of the weighted signal aggregator 2200 is described by the following equation:

$$A_\lambda(a_1, \ldots, a_n) = \begin{cases} \dfrac{\prod_{i=1}^{n}(1+\lambda w_i a_i) - 1}{\prod_{i=1}^{n}(1+w_i \lambda) - 1} & \lambda \geq -1, \lambda \neq 0 \\ \dfrac{\sum_{i=1}^{n} w_i a_i}{\sum_{i=1}^{n} w_i} & \lambda = 0 \end{cases} \quad \text{EQU. 8}$$

where, $\lambda \geq -1$ is the control parameter that is used to configure the aggregator 2200;

$a_i \in [0,1]$ is a $i^{th}$ input to the aggregator 2200;

$w_i \in [0,1]$ is a $i^{th}$ input weight;

n>1 is an integer number of inputs; and $A_\lambda(a_1, \ldots, a_n) \in [0,1]$ is the output of the aggregator 2400.

The inputs $a_i$ and the weights $w_i$ are suitably in the range from zero to one and the control signal $\lambda$ is suitably greater than or equal to minus one. For such ranges of the inputs $a_k$, weights $w_i$ and control signal $\lambda$ the output $A_\lambda(a_1, \ldots, a_n)$ is also in the range zero to one.

By evaluating the recursion relation:

$$\Psi_i = w_i a_i + \Psi_{i-1} + \lambda w_i a_i \Psi_{i-1}, i=1, \ldots, n; \quad \text{EQU. 9}$$

starting with an initial value:

$$\Psi_0 = 0$$

until $\psi_N$ is obtained and multiplying $\psi_N$ by $\lambda$ the numerator of equation eight is obtained for the cases $\lambda \geq -1$, $\lambda \neq 0$. For the case $\lambda = 0$ the recursion relation simply sums the terms $w_i a_i$ of the summation in the numerator of equation 7 for the case $\lambda = 0$. Furthermore by evaluating the recursion relation:

$$\Psi_i = w_i + \Psi_{i-1} + \lambda w_i \Psi_{i-1}, i=1, \ldots, n; \quad \text{EQU. 10}$$

starting with an initial value:

$$\Psi_0 = 0$$

until $\psi_N$ is obtained and multiplying $\psi_N$ by $\lambda$ the denominator of equation eight is obtained for the cases $\lambda \geq -1$, $\lambda \neq 0$. For the case $\lambda = 0$ the recursion relation given by equation 10 reduces to the summation of the weights indicated in the denominator of equation 8 for the case $\lambda = 0$. By setting all the weights equal to one the non-weighted aggregator given by equation two is obtained.

Figure 24:
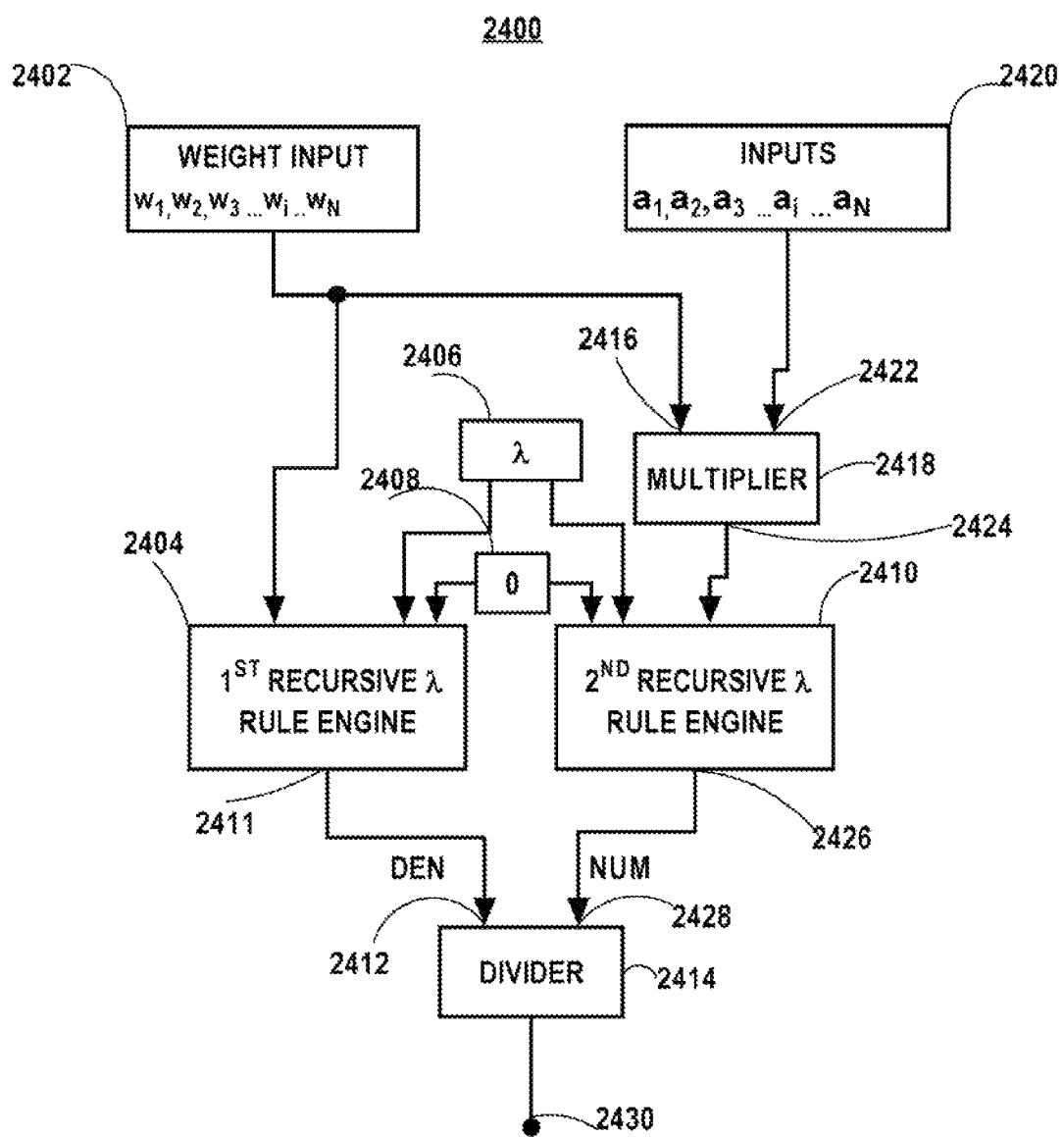
FIG. 24 is a weighted signal aggregator that uses two of the recursive lambda rule engines shown in FIG. 23.

Referring to FIG. 24, a sequence of input weights $w_i$ are input through a weight input 2402 that is coupled to a first recursive lambda rule engine 2404. The control signal $\lambda$ is input via a control signal input 2406 that is also coupled to the first recursive lambda rule engine 2404. Also, an initial value of zero is input via a zero input 2408. The MUX 2334 of the first recursive lambda rule engine 2404 and of a second recursive lambda rule engine 2410 are initially set to pass the zero from the zero input 2408. The first recursive lambda rule engine 2404 is operated until the value $\psi_N$ (given by equation 8) is computed. The value of $\psi_N$ is coupled from an output 2411 of the first recursive lambda rule engine 2404 to a denominator input 2412 of a divider 2414.

The sequence of input weights $w_i$ are also coupled to first input 2416 of a multiplier 2418. An input 2420 of the aggregator for receiving the values $a_i$ to be aggregated is coupled to a second input 2422 of the multiplier 2418. The multiplier 2418 outputs a sequence of products $w_i a_i$. An output 2424 of the multiplier 2418 is coupled to the second recursive lambda rule engine 2410. (Note that either of the recursive lambda rule engines 2300 shown in FIG. 23 can be used in the aggregator 2400.) The second recursive lambda rule engine 2410 is operated until the value $\psi_N$ (given by equation 7) is computed. The value of $\psi_N$ computed by the second recursive lambda rule engine 2410 is coupled from an output 2426 of the second recursive lambda rule engine 2410 to a numerator input 2428 of the divider 2414. An output 2430 of the divider 2414 outputs the output $A_\lambda(a_1, \ldots, a_n)$ of the aggregator 2400. The recursive lambda rule engine 2100 and the weighted aggregator 2400 are disclosed in co-pending patent application Ser. No. 11/544,704 (CML03293T) "HARDWARE ARITHMETIC ENGINE FOR LAMBDA RULE COMPUTATIONS" to Irfan Nasir et al. One skilled in the art will appreciate that the signal aggregator 700 shown in FIG. 7 can also be made into a weighted aggregator by adding weight registers and multipliers before the signal inputs 702, 704.

Figure 25:
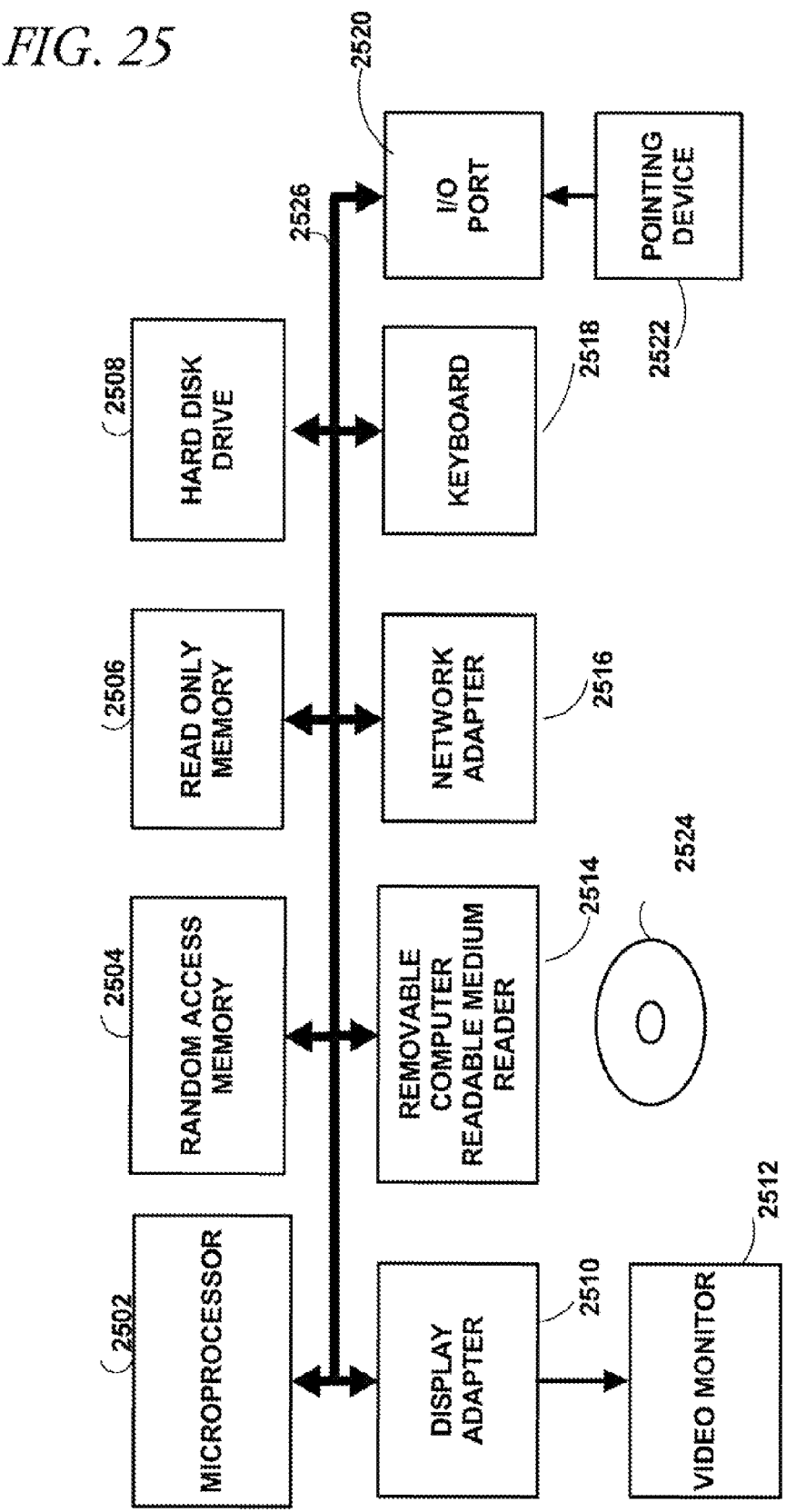
FIG. 25 is a block diagram of a computer 2500 that is used to run software implementations of the systems disclosed herein according to certain embodiments of the invention.

FIG. 25 is a block diagram of a computer 2500 that is used to run software implementations of the systems disclosed herein according to certain embodiments of the invention. The computer 2500 comprises a microprocessor 2502, Random Access Memory (RAM) 2504, Read Only Memory (ROM) 2506, hard disk drive 2508, display adapter 2510, e.g., a video card, a removable computer readable medium reader 2514, a network adaptor 2516, a keyboard 2518, and an I/O port 2520 communicatively coupled through a digital signal bus 2526. A video monitor 2512 is electrically coupled to the display adapter 2510 for receiving a video signal. A pointing device 2522, e.g., a mouse, is coupled to the I/O port 2520 for receiving signals generated by user operation of the pointing device 2522. The network adapter 2516 can be used, to communicatively couple the computer 2500 to an external source of data, e.g., a remote server. The computer readable medium reader 2514 preferably comprises a Compact Disk (CD) drive. A computer readable medium 2524, that includes software embodying the programs described above is provided. The software included on the computer readable medium 2524 is loaded through the removable computer readable medium reader 2514 in order to configure the computer 2500 to carry out programs of the current invention that are described above with reference to the FIGs. The computer 2500 may for example comprise a personal computer or a work station computer. Computer readable media used to store software embodying the programs described above can take on various forms including, but not limited to, magnetic media, optical media, and semiconductor memory.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A signal aggregator comprising:
   an aggregator processing unit;
   a first signal input for receiving a first signal coupled to said aggregator processing unit;
   a second signal input for receiving a second signal coupled to said aggregator processing unit;
   a control signal input for receiving a control signal that configures the aggregator processing unit, coupled to said aggregator processing unit;
   an output for outputting an aggregate signal computed by the aggregator processing unit;
   wherein the aggregator processing unit is adaptable by setting the control signal input to emulate a MIN circuit, a MAX circuit, and averager circuit.

2. The signal aggregator according to claim 1 further comprising:
   a first adder comprising a first input coupled to said first signal input, a second input coupled to said second signal input and a first adder output;
   a first multiplier comprising a first input coupled to said first signal input, a second input coupled to said second signal input and a first multiplier output;
   a second multiplier comprising a first input coupled to said first multiplier output, a second input coupled said control signal input and a second multiplier output;
   a second adder comprising a first input coupled to said first adder output, a second input coupled to said second multiplier output, and a second adder output;
   a third adder comprising a first input coupled to said first control signal input, a second input set to a constant, and a third adder output; and
   a divider comprising a numerator input coupled to said second adder output, a denominator input coupled to said third adder output, and an divider output coupled to said output of said aggregator.

3. A machine learning system comprising:
   a processing system comprising:
      a processing system input;
      a processing system output;
      one or more signal aggregators according to claim 2;
   a training data memory comprising:
      input signal data; and
      associated output signal data;
      wherein, said processing system input is coupled to said training data memory for receiving said input signal data;
   an objective function evaluator comprising:
      a first objective function evaluator input coupled to said processing system output;
      a second objective function evaluator input coupled to said training data memory for receiving said associated output signal data; and
      an objective function evaluator output;
   a control signal memory coupled to said control signal inputs of said one or more signal aggregators; and
   a training supervisor comprising:
      an input coupled to said objective function evaluator output;
      wherein, said training supervisor is also coupled to said control signal memory for reading and updating said control signal of said one or more aggregators; and
      wherein said training supervisor is adapted to optimize said control signal of said one or more aggregators with an objective of minimizing a difference between said processing system output and said associated output signal data.

4. An artificial neural network comprising:
   a plurality of inputs for receiving data;
   a plurality of processing nodes that are coupled to the plurality of inputs, wherein each of the plurality of processing nodes comprise said signal aggregator according to claim 1.

5. The signal aggregator according to claim 1 wherein:
   wherein the aggregator processing unit is adapted to execute a function:

$$A_\lambda(a_1, \ldots, a_n) = \begin{cases} \dfrac{\prod_{i=1}^{n}(1+\lambda w_i a_i) - 1}{\prod_{i=1}^{n}(1+w_i\lambda) - 1} & \lambda \geq -1, \lambda \neq 0 \\ \dfrac{\sum_{i=1}^{n} w_i a_i}{\sum_{i=1}^{n} w_i} & \lambda = 0 \end{cases}$$

where,
$\lambda >= -1$ is the control signal;
$a_k \in [0,1]$ is a value of a $k^{th}$ input to the aggregator;
$w_i \in [0,1]$ is a $i^{th}$ input weight;
$n>1$ is an integer number of inputs of the aggregator; and
$A_\lambda(a_1, \ldots, a_n) \in [0,1]$ is a value of the aggregate signal.

6. The signal aggregator according to claim 5 wherein the aggregator processing unit comprises a microprocessor coupled to a memory storing programming instructions for evaluating said function.

7. The signal aggregator according to claim 5 comprising more than two signal inputs.

8. A method of aggregating signals comprising:
   receiving at a first signal input a first signal;
   receiving at a second signal input a second signal;
   receiving a control signal $\lambda$ at a control signal input;
   aggregating by an aggregator processing unit, the first signal and the second signal with an aggregator that is modeled by a function:

$$A_\lambda(a_1, \ldots, a_n) = \begin{cases} \dfrac{\prod_{i=1}^{n}(1+\lambda w_i a_i) - 1}{\prod_{i=1}^{n}(1+w_i\lambda) - 1} & \lambda \geq -1, \lambda \neq 0 \\ \dfrac{\sum_{i=1}^{n} w_i a_i}{\sum_{i=1}^{n} w_i} & \lambda = 0 \end{cases}$$

where,
$\lambda >= -1$ is the control signal;
$a_k \in [0,1]$ is a value of a $k^{th}$ input to the aggregator;
$w_i \in [0,1]$ is a $i^{th}$ input weight;
$n>1$ is an integer number of inputs of the aggregator; and
$A_\lambda(a_1, \ldots, a_n) \in [0,1]$ is a value of an aggregate signal.

* * * * *